Dec. 9, 1924.
A. ARUTÜNOFF
1,518,952
ELECTRIC MOTOR WITH SQUIRREL CAGE ROTOR
Filed July 14, 1922  2 Sheets-Sheet 1
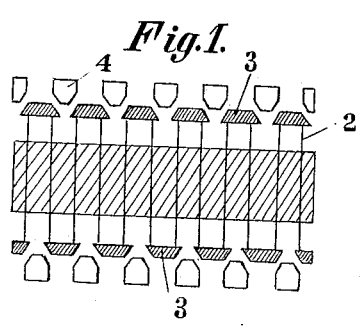
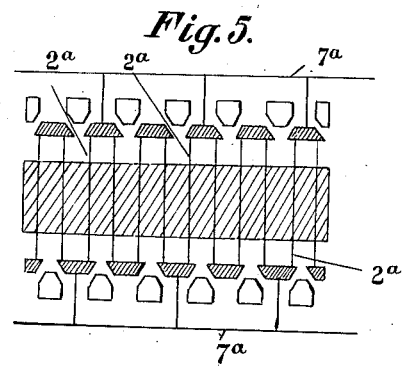
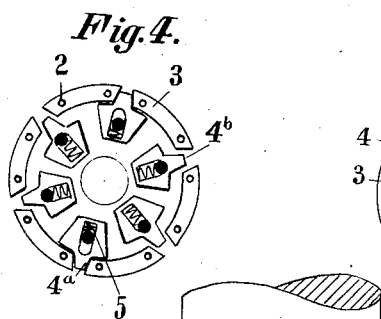
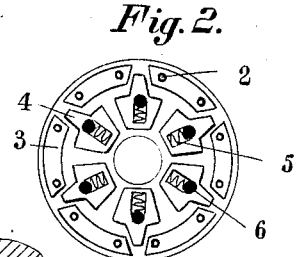
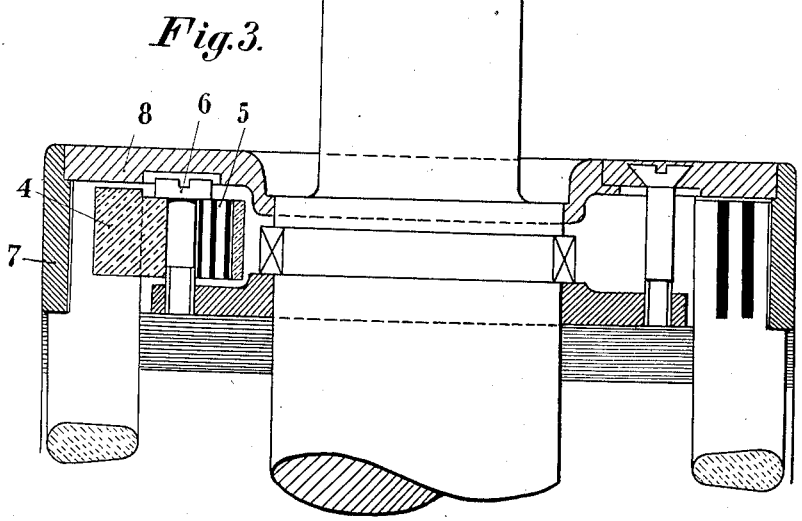

Dec. 9, 1924.                                                1,518,952
                        A. ARUTÜNOFF
            ELECTRIC MOTOR WITH SQUIRREL CAGE ROTOR
                   Filed July 14, 1922       2 Sheets-Sheet 2
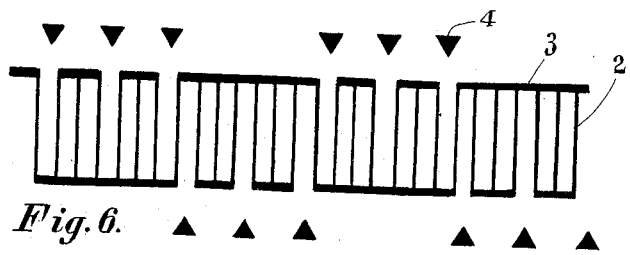
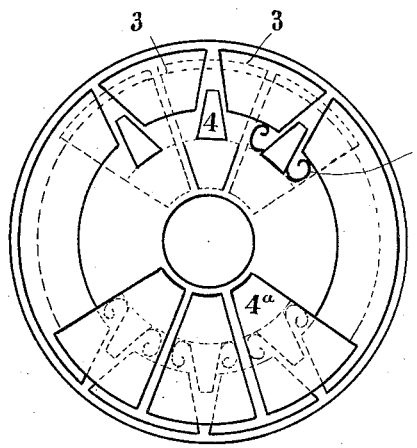
Fig. 7.
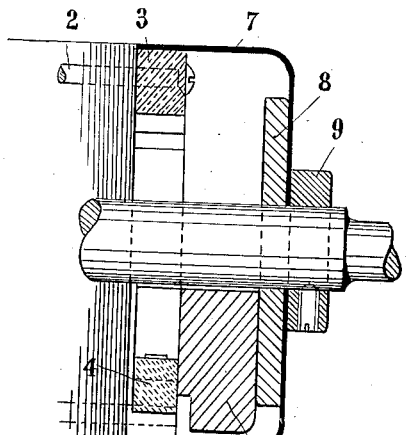
Fig. 8.
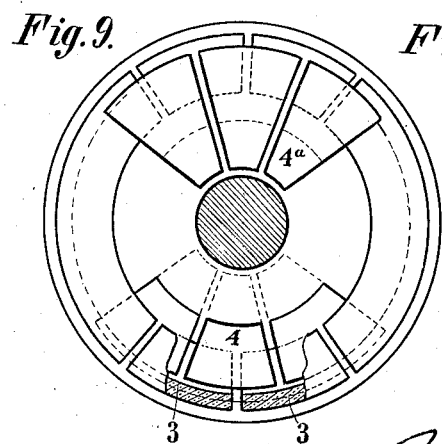
Fig. 9.
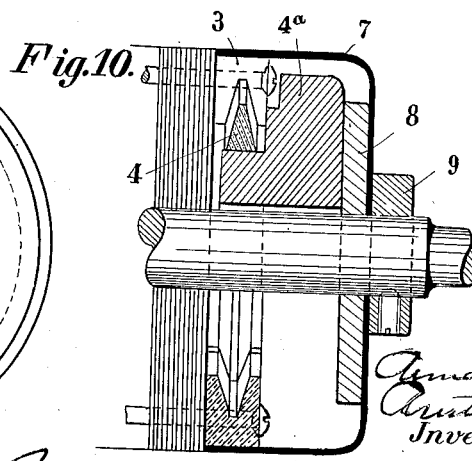
Fig. 10.

Patented Dec. 9, 1924.

1,518,952

UNITED STATES PATENT OFFICE.

ARMAIS ARUTÜNOFF, OF BERLIN, GERMANY, ASSIGNOR TO STEPHEN SPRINGETT, OF JACKSON, MICHIGAN.

ELECTRIC MOTOR WITH SQUIRREL-CAGE ROTOR.

Application filed July 14, 1922. Serial No. 574,963.

*To all whom it may concern:*

Be it known that I, ARMAIS ARUTÜNOFF, residing at 35 Münchenerstrasse, Berlin W., Germany, have invented certain new and useful Improvements in Electric Motors with Squirrel-Cage Rotors, of which the following is a specification.

This invention is a novel improvement in induction motor starting devices, and is especially adapted for use with motors of the squirrel cage type, and the principal object of the invention is to provide a novel and efficient starting device for motors with squirrel-cage rotors, means being provided for securing a large resistance in the rotor winding conductors when starting, and means being provided for throwing parts of the resistance, preferably in sequence, out of the rotor winding circuit as the rotor develops speed.

In my invention the squirrel-cage rotor has a high resistance at the starting of the motor, preferably obtained by cutting one, or both, of the rotor rings into non-contacting segments; and the resistance of the rotor is reduced, as sufficient speed of the rotor is obtained, by means of wedge shaped contact members which are actuated by means of centrifugal force to bridge the gaps between the adjacent segments on the rotor.

Means are provided whereby, as the rotatorial speed of the rotor is reduced one or more of the contact members will be automatically withdrawn out of contact with the related segments, thereby increasing the rotor resistance according to the reduction of speed; whereby the rotor torque at any speed of rotation of the rotor is always substantially the same.

I will explain the invention with reference to the accompanying drawings, which illustrate practical embodiments thereof, to enable others to adapt and use the same; and summarize in the claims the novel features of construction and novel combinations of parts, for which protection is desired.

In the drawings:

Figure 1 is a diagrammatical view of a squirrel cage rotor showing the contact members retracted.

Figure 2 is an end view of the rotor, showing the ring segments, and the position of the contact members when the rotor is at rest.

Figure 3 is a detail sectional view through one end of the rotor, showing the one arrangement of the contact members, their springs, and fastening means.

Figure 4 is a detail view showing some of the contact members in projected position.

Figure 5 is a diagrammatic plan view of a squirrel-cage rotor showing how a few of the bars may be permanently short-circuited.

Figure 6 is a diagrammatic switching diagram for a four-pole motor wherein one seventh of the rotor conductors are shown as short-circuited, and the remaining conductors are connected together in groups in such manner that each group covers less than half a pole pitch.

Figure 7 is an enlarged view of the rotor, at rest, showing the contact members as provided with weights and retracting springs, and further showing the contact surfaces arranged vertically to the rotor face, as in Figs. 2 and 4.

Figure 8 is a vertical sectional view of Fig. 7.

Figure 9 is a view similar to Fig. 7 showing a slight modification of the construction.

Figure 10 is a vertical section through Fig. 9.

In my invention one or both of the rotor short circuiting rings is divided into a plurality of segments 3, which are preferably entirely separated as indicated in Figs. 2, 4 and 7. Preferably the adjacent ends of these segments 3 are beveled so that the opposed ends of adjacent segments 3 converge outwardly, as shown in said figures, forming approximately wedge-shaped gaps between the adjacent segments.

As shown in Figs. 2 and 3, radially movable contact members 4 are slidably connected to the rotor by suitable means, such as screws 6 engaging slots in the contact members; and said members are normally retracted by suitable spring means. In Figs. 2 and 3 springs 5 are interposed between the screws 6 and the inner ends of the slots in the contact members 4.

In Fig. 4 it is assumed that the armature is running at slow speed and this figure illustrates how by employing springs of different strength, some of the contact members will be "closed" while other contact members 4ª, whose springs are more resistant are still held in their normally "open" position.

In an arrangement in which the conductors or rods 2 are connected in series as indicated in Fig. 1 the induced currents substantially neutralize each other; as the conductors or rods in the neutral zone act as resistances. In Fig. 1 the armature is assumed to be standing still. The rods 2 are connected in series with the segments 3 of the ring in such manner that the currents induced in the rods 2 oppose each other. In case the rotor has a very high resistance the arrangement shown in Fig. 5 can be adopted, in this case a few rods 2ª are permanently short-circuited when the rotor is not in motion: such short-circuiting may be effected by electrically connecting the segments 3 to which these rods are attached to an annular ring 7, (Fig. 3), or to the dust cap 7ˣ, as in Figs. 8 and 10.

In a rotor of the present description a good contact between the radially movable contacts members and ring contact segments is necessary. In order to accomplish this, the outer ends of contact members 4 are preferably provided with wedge-shaped portions and when projected outwardly, under the influence of centrifugal force, these wedge-shaped portions enter between the converging ends of the adjacent ring contact segments, and having ample contact surface make a reliable electrical connection.

When the contact members 4 are moved outward by centrifugal force a good electrical contact is insured between them and the contacts 3.

Each contact member 4 is preferably provided with a weight 4ª to increase the mass subject to centrifugal action. The weights 4ª are preferably retained in operative position by means of a disc 8 (Figs. 8 and 10) and a collar 9, which allow the weights to move radially outward under the influence of centrifugal force.

The spring means (as 5) tend to retract the wedge-shaped contact members 4 radially inwardly toward the axis of the rotor as the rotor slows down, and hold same inward when the rotor is at rest.

As shown in Figs. 9 and 10 each contact segment is provided with a wedge-shaped groove and the wedge-shaped portions of the contacts 4 enter said grooves when the contact members are projected outwardly under the action of centrifugal force.

The rotor may be disposed horizontally as well as perpendicularly.

The entire device is preferably made dust-tight by means of a cap 7ˣ (Figs. 8 and 10).

In my invention it is not necessary that the several contact segments 3 of the short-circuit ring be bridged in succession. In some cases the various segments 3 of the short-circuit ring may be short-circuited simultaneously, as the contact members adjust themselves automatically under the influence of centrifugal force, and correspondingly vary the volume of electrical current passing through the contact surfaces.

Ordinary contact of metal against metal is not sufficient for short-circuiting the ring segments 3, since between the adjacent segments there is a potential of only a small fraction of one volt, while several thousands of amperes may pass through the contact. The wedge-shaped contacts 4, actuated by centrifugal force, produce effective contact with the segments, giving large specific pressure and large contacting surface, and through the contact members the shortest path for the current is created. The variations in pressure of the wedge-shaped contacts 4 against the segments 3, as the wedge-shaped members are actuated by centrifugal force, cause a variable resistance in the short-circuited ring segments which is in proportion to the contact pressure.

I do not limit myself to the exact forms of the invention shown in the drawings, for obviously, various other arrangments of parts may be made within the scope of the invention; and having described and disclosed the nature of my invention, and in what manner the same is to be performed,—

I claim:

1. In an induction motor, an annular series of segments having converging portions; and a plurality of radially movable contact members adapted to be moved outward by centrifugal force; said contact members also having converging portions adapted to engage converging portions of the adjacent segments and close the gaps between such segments and make broad contact therewith when the contact members are projected.

2. In an induction motor having a squirrel cage rotor with uninsulated bars, an annular series of segments having converging portions; and a plurality of radially movable weighted contact members slidably mounted on the rotor end and adapted to be moved outwardly by centrifugal force; said contact members having converging portions adapted to engage the converging portions of the segments and close the gaps between the adjacent segments and make broad contact with the segments when the contact members are projected outwardly.

3. In combination with an induction motor as set forth in claim 1, a metallic dust cap enclosing the segmental ring and contact members, and said dust cap being in permanent electrical connection with some of the conductors to decrease the resistance of said rotor winding.

4. In combination with an induction motor as set forth in claim 2, metallic dust caps enclosing the segmental rings and contact members, said dust ring being in permanent electrical connection to short-circuit some of the conductors of the rotor winding, to decrease the resistance of said rotor winding.

5. In an induction motor having a squirrel-cage rotor with the conductors thereof directly connected to segmental rings mounted on the ends of said rotor, a plurality of radially disposed contact members slidably mounted on said rotor and adapted to be projected outwardly by centrifugal force to fill the gaps between adjacent ring segments as the speed of the rotor is developing, a collar enclosing said ring and contact members, said collar being electrically connectible to some of the conductors to short-circuit some of said conductors, to diminish the resistance of the rotor winding.

6. In combination with a motor as set forth in claim 5, said contact pieces being wedge shaped, and the adjacent faces of said ring segments correspondingly converging outwardly to receive the wedge shaped ends of said contact members, thereby presenting a large contact surface.

7. In an induction motor having a squirrel-cage rotor winding with the conductors thereof directly connected to segmental rings mounted on the ends of said rotor, a plurality of radially disposed contact members slidably mounted on said rotor and adapted to be projected outwardly by centrifugal force to fill the gaps between adjacent ring segments as the speed of the rotor is developing, a dust cap enclosing said ring and contact members, said cap being electrically connected to some of the conductors to permanently short-circuit said conductors thereby diminishing the resistance of the rotor winding.

8. In combination with a motor as set forth in claim 7, said contact pieces being wedge shaped, and the adjacent faces of said ring segments correspondingly converging outwardly to receive the wedge shaped ends of said contact members to present a large contact surface when the latter are projected radially outwardly by centrifugal force.

In testimony whereof I have signed this specification in the presence of two witnesses.

ARMAIS ARUTÜNOFF.

Witnesses:
  E. HÖLTZERMANN,
  R. G. ALLSPELLE,